United States Patent
Strauch et al.

(10) Patent No.: US 12,158,193 B2
(45) Date of Patent: Dec. 3, 2024

(54) VERTICAL GUIDE CHANNEL

(71) Applicant: IGUS GMBH, Cologne (DE)

(72) Inventors: Christian Strauch, Bad Honnef (DE); Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 33 days.

(21) Appl. No.: 17/905,420

(22) PCT Filed: Mar. 2, 2021

(86) PCT No.: PCT/EP2021/055144
§ 371 (c)(1),
(2) Date: Sep. 1, 2022

(87) PCT Pub. No.: WO2021/175830
PCT Pub. Date: Sep. 10, 2021

(65) Prior Publication Data
US 2023/0142733 A1    May 11, 2023

(30) Foreign Application Priority Data
Mar. 6, 2020   (DE) .................... 20 2020 101 247.9

(51) Int. Cl.
*F16G 13/16* (2006.01)
*H02G 3/04* (2006.01)
*H02G 11/00* (2006.01)

(52) U.S. Cl.
CPC ........... *F16G 13/16* (2013.01); *H02G 3/0456* (2013.01); *H02G 11/006* (2013.01)

(58) Field of Classification Search
CPC ......... F16G 13/16; F16L 3/26; H02G 3/0456; H02G 11/006
See application file for complete search history.

(56) References Cited

U.S. PATENT DOCUMENTS 3,779,003 A * 12/1973 Boissevain ............. F16G 13/16
59/78.1
5,178,247 A   1/1993 Vagaggini
(Continued)

FOREIGN PATENT DOCUMENTS

DE    20101656    5/2001
DE    20305618    7/2003
(Continued)

OTHER PUBLICATIONS

International Search Report from corresponding PCT Appln. No. PCT/EP2021/055144, dated Jun. 7, 2021.
International Preliminary Report on Patentability from corresponding PCT Appln. No. PCT/EP2021/055144, dated Sep. 6, 2022.
Office Action from related Japanese Appln. No. 2022-552232, dated Jan. 30, 2024. English translation attached.
(Continued)

*Primary Examiner* — Monica E Millner
(74) *Attorney, Agent, or Firm* — Grossman, Tucker, Perreault & Pfleger, PLLC

(57) ABSTRACT

A guide channel for guiding an energy chain along a vertical line or along a line running with a vertical component, which guide channel has delimiting walls that are formed by separate guide plates and are arranged opposite each other. The two guide plates have smooth sliding surfaces on their sides facing the energy chain, which sliding surfaces are provided, in their lateral edge regions, with guide flanges protruding at a right angle. The guide plates are retained in brackets, which can be fastened, with a height offset at distances, to a supporting wall and which are U-shaped. The exterior side of the U web of the bracket lies against the supporting wall, and the guide plates can be fastened to the interior sides of the U legs of the bracket.

24 Claims, 4 Drawing Sheets

(56) References Cited

U.S. PATENT DOCUMENTS

| | | | | |
|---|---|---|---|---|
| 6,119,836 | A * | 9/2000 | Blase | H02G 11/006 |
| | | | | 191/1 R |
| 6,424,779 | B1 * | 7/2002 | Ellison | G02B 6/4459 |
| | | | | 385/134 |
| 6,494,414 | B2 * | 12/2002 | Benito-Navazo | H02G 3/0418 |
| | | | | 174/101 |
| 6,796,409 | B2 | 9/2004 | Hermey et al. | |
| 9,685,773 | B2 | 6/2017 | Jaeker et al. | |
| 10,088,097 | B2 | 10/2018 | Hermey | |
| 10,693,285 | B2 * | 6/2020 | Jaeker | H02G 3/0608 |
| 11,217,973 | B2 * | 1/2022 | Jaeker | F16G 13/16 |
| 11,437,793 | B2 * | 9/2022 | Johnson | H02G 3/0608 |
| 2014/0061415 | A1 * | 3/2014 | Hermey | F16M 13/02 |
| | | | | 248/316.1 |
| 2015/0001022 | A1 | 1/2015 | Jaeker et al. | |
| 2020/0021092 | A1 | 1/2020 | Johnson et al. | |

FOREIGN PATENT DOCUMENTS

| | | |
|---|---|---|
| DE | 10253267 | 5/2004 |
| DE | 202011100313 | 2/2012 |
| DE | 202012000614 | 6/2012 |
| DE | 102014110508 | 1/2016 |
| EP | 2546546 | 1/2013 |
| EP | 2575225 | 4/2013 |
| JP | 2010-247634 | 11/2010 |

OTHER PUBLICATIONS

Office Action from related Korean Appln. No. 10-2022-7034591, dated Jul. 18, 2024. English translation attached.

Office Action from related Japanese Appln. No. 2022-552232, dated Jul. 30, 2024. English translation attached.

* cited by examiner

FIG 1
FIG. 2
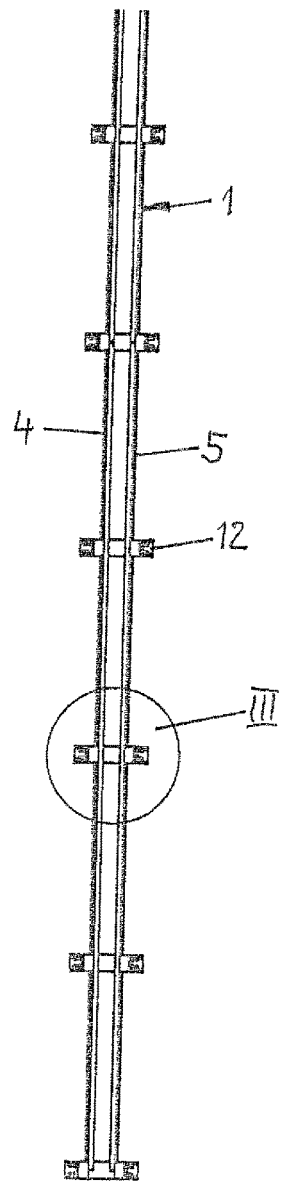
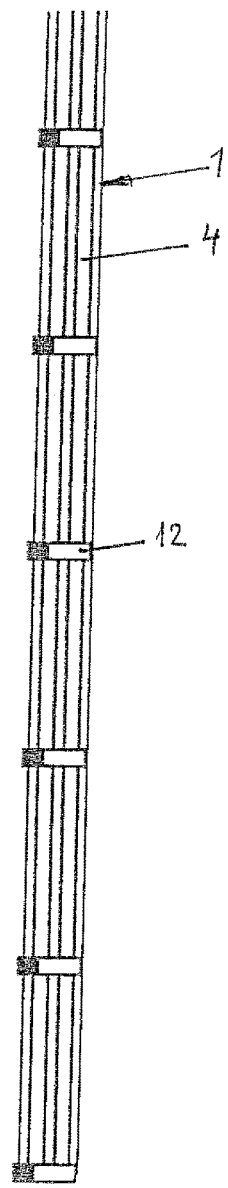

VERTICAL GUIDE CHANNEL

FIELD

The invention relates to a guide channel-type device for guiding an energy chain, consisting of links that are movably connected to one another, along a vertical line or a line running with a vertical component, wherein flexible supply lines which connect a connector arranged at a fixed height to a vertically movable device or a machine are guided in the energy chain, and wherein the energy chain is guided between lateral delimiting walls.

BACKGROUND

A guide channel for energy chains is known (EP 2546546 B1), which is also suitable for vertical operation. The energy chain is retained within the guide channel magnetically. For this, the chain links are in each case provided, on the outer surfaces of their webs, with a permanent magnet, which interacts with a steel plate embedded in the base of the guide channel. Aside from the fact that the guide channel can only receive a single strand and is only suitable for specifically adapted energy chains, such an arrangement is relatively expensive. Details of how the guide channel can be fastened to vertical walls are not contained in this published document.

Another known device (U.S. Pat. No. 5,178,247), which is provided exclusively for horizontal operation, consists substantially of a U-shaped guide channel for energy chains, wherein the side walls of the guide channel have, at their lower and upper end, protrusions bent inwards by 90°. In the case of this guide channel bent out of sheet metal, the side walls are connected to one another via a base moulded in one piece. The channel is fastened on a flat, horizontal support via screws which reach through the base.

Furthermore, a guide channel for energy chains is known (DE 202011100313 U1), which is likewise provided for horizontal operation. The guide channel is formed U-shaped and can be fastened to a smooth, vertical wall with the aid of lateral retainers.

SUMMARY

The object of the invention is to provide a vertical guide, for energy chains known per se, which can be produced with little outlay and can be conveniently fastened to a vertical wall.

According to the invention, this object is achieved by the fact that:
- the lateral delimiting walls are formed by separate guide plates, which are arranged opposite one another;
- the two guide plates have smooth sliding surfaces on their sides facing the energy chain;
- the sliding surfaces are provided with guide flanges protruding at a right angle in their lateral edge regions;
- the guide plates are retained in brackets, which can be fastened at intervals, with a height offset, to a supporting wall;
- the brackets are formed U-shaped, wherein the exterior side of the U web of the bracket rests against the supporting wall; and
- the guide plates can be fastened to the interior sides of the U legs of the bracket.

A completely new guide system, which does not require a guide channel formed in the conventional sense, is created by the invention. It is merely the case that elongated, separate guide plates, which have smooth sliding surfaces on their sides facing the energy chain, are provided as lateral delimiting walls. In order to retain the energy chain between the guide plates, the latter have guide flanges protruding at a right angle in their edge regions. Together with the brackets arranged at intervals, with a height offset, the guide plates are held in their position, with the result that a good guideway for an energy chain is guaranteed between the guide plates.

The device according to the invention can receive two strands of an energy chain connected to one another by a deflection region, wherein the guide flanges running in the lateral edge regions of the sliding surfaces delimit the space in which the two strands of the energy chain move. This results in a very compact design, which has only a very small space requirement.

Catch means, which can engage in one another and thus provide a firm hold over the entire length of the guide channel, are preferably provided on the rear sides of the guide plates facing the U legs of the brackets and on the interior sides of the U legs.

The catch means provided on the rear sides of the guide plates are protrusions, expediently provided in pairs, with undercut lugs, wherein the lugs of a pair of protrusions point in opposing directions. Correspondingly, counter-protrusions, formed in pairs, with undercut lugs which likewise point in opposing directions, are formed on the U legs of the brackets, wherein, when the guide plates are pressed against the interior sides of the U legs, the lugs formed on the protrusions and counter-protrusions snap in behind one another through slight elastic deformation of the protrusions and counter-protrusions. This makes a good seat possible, which also withstands relatively large vibrations.

In order to achieve a sufficiently reliable hold across the width of the guide plates, in each case two pairs of protrusions and counter-protrusions can be arranged on the rear sides of the guide plates and on the interior sides of the U legs.

The protrusions and counter-protrusions are expediently formed as continuous ribs and the undercut lugs provided on the ribs also extend continuously over the entire length of the ribs.

The protrusions and counter-protrusions formed as ribs preferably run in the vertical direction. An optimal and stable hold is thereby achieved.

The protrusions formed as ribs on the rear sides of the guide plates expediently extend over the entire length of the guide plates. As a result, the guide plates gain additional stiffening, with the result that the guide plates also gain sufficient stability in the free regions between two brackets, in which there is no support.

Nubs which jut out beyond the level of the rib-shaped protrusions can be provided on the sides of the rib-shaped counter-protrusions provided on the bracket which rest against the rib-shaped protrusions of the guide plates in the engaged state. This guarantees a better hold of the protrusions and counter-protrusions snapped into one another and creates a reliable securing against a displacement of the parts relative to one another.

For the exact positioning of the guide plates, at least two stops are provided on the brackets, with the result that an optimal dimensional accuracy is guaranteed for receiving the strands between the guide plates.

The stops are formed such that the inner stop is formed as a continuous stop bar on the interior side of the U web and the outer stop is formed as an inwardly bent tip of the respective U leg of the bracket.

The brackets can be formed as one-piece plastic parts. Preferably, PVC or PE is used for the production of the brackets.

The guide plates, as one-piece parts, can also consist of PVC or PE, wherein of course it also appears to be possible to produce the guide plates from metal.

The guide plates and the brackets can be extruded or also injection moulded.

The web and the two U legs of the bracket preferably consist of two plates running at a distance from one another, which are connected to one another by ribs arranged truss-like. A considerable material saving is thereby possible during the production of the brackets, without the stability of the brackets being adversely affected.

Protruding fastening flanges, via which the respective bracket can be connected to the supporting wall with the aid of fastening elements, can be provided on both sides of the U web of the bracket.

Furthermore, retainers for lines to be laid in a fixed manner can be arranged on the exterior side of the U legs of the brackets.

BRIEF DESCRIPTION OF THE DRAWINGS

The invention is illustrated by way of example in the drawing and described in detail in the following with reference to the drawing.

There are Shown in:

FIG. 1 a view of an embodiment example of the vertical guide channel according to the invention;

FIG. 2 a side view of the guide channel according to FIG. 1;

DETAILED DESCRIPTION

Figure 3:
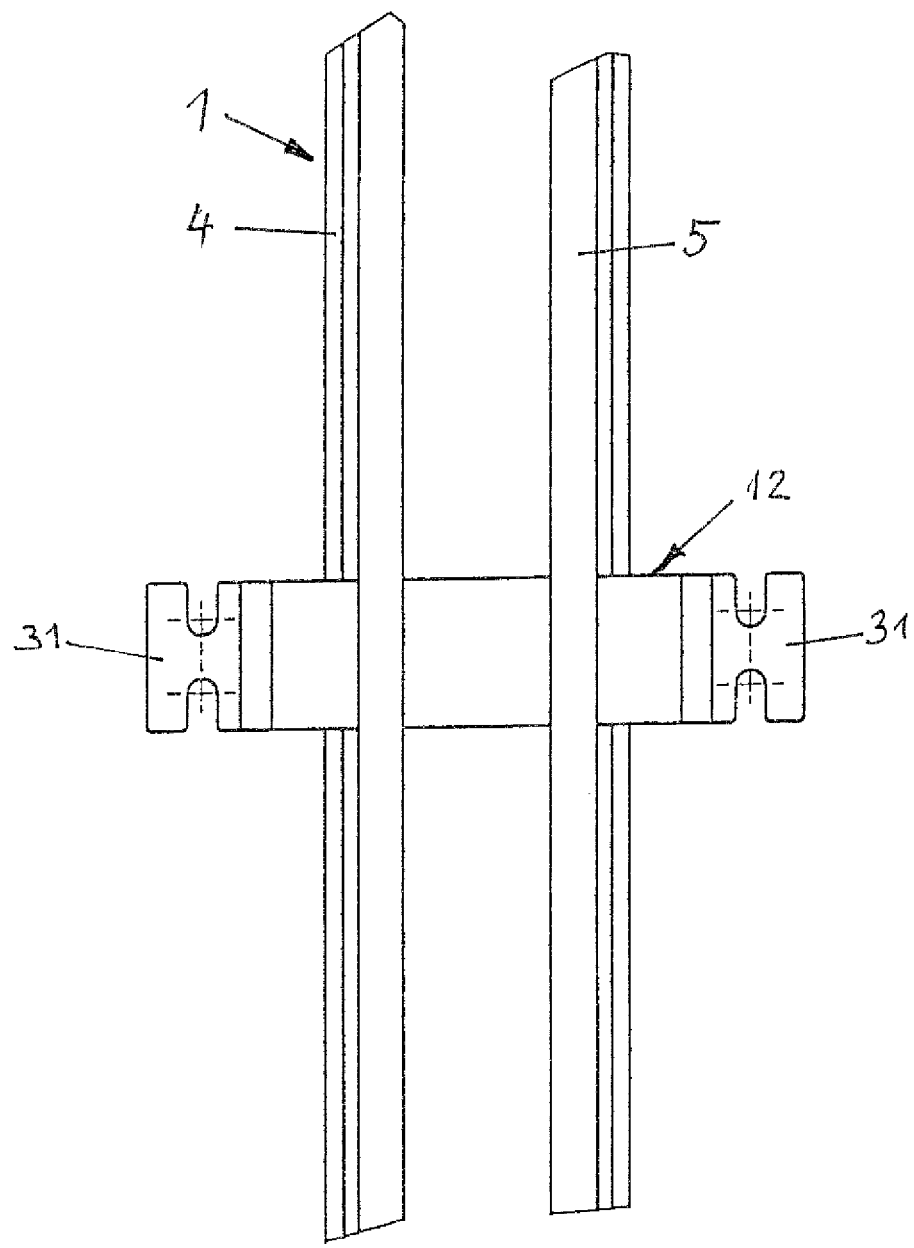
FIG. 3 the section III from FIG. 1 on a greatly enlarged scale.

In FIGS. 1 and 2 of the drawing, a guide channel 1 for the vertical guiding of energy chains is represented. Such a guide channel 1 can also advantageously be used when the guiding is to be effected over a line which merely has a vertical component, thus runs over an incline. In the present case, the energy chain is used for guiding flexible supply lines which connect a connector arranged at a fixed height to a vertically movable device or a machine.

The energy chain is guided between lateral delimiting walls, which are formed by separate guide plates 4 and 5 in the device according to the invention. The guide plates 4 and 5 are retained in brackets 12, which are described in more detail in the following.

Figure 4:
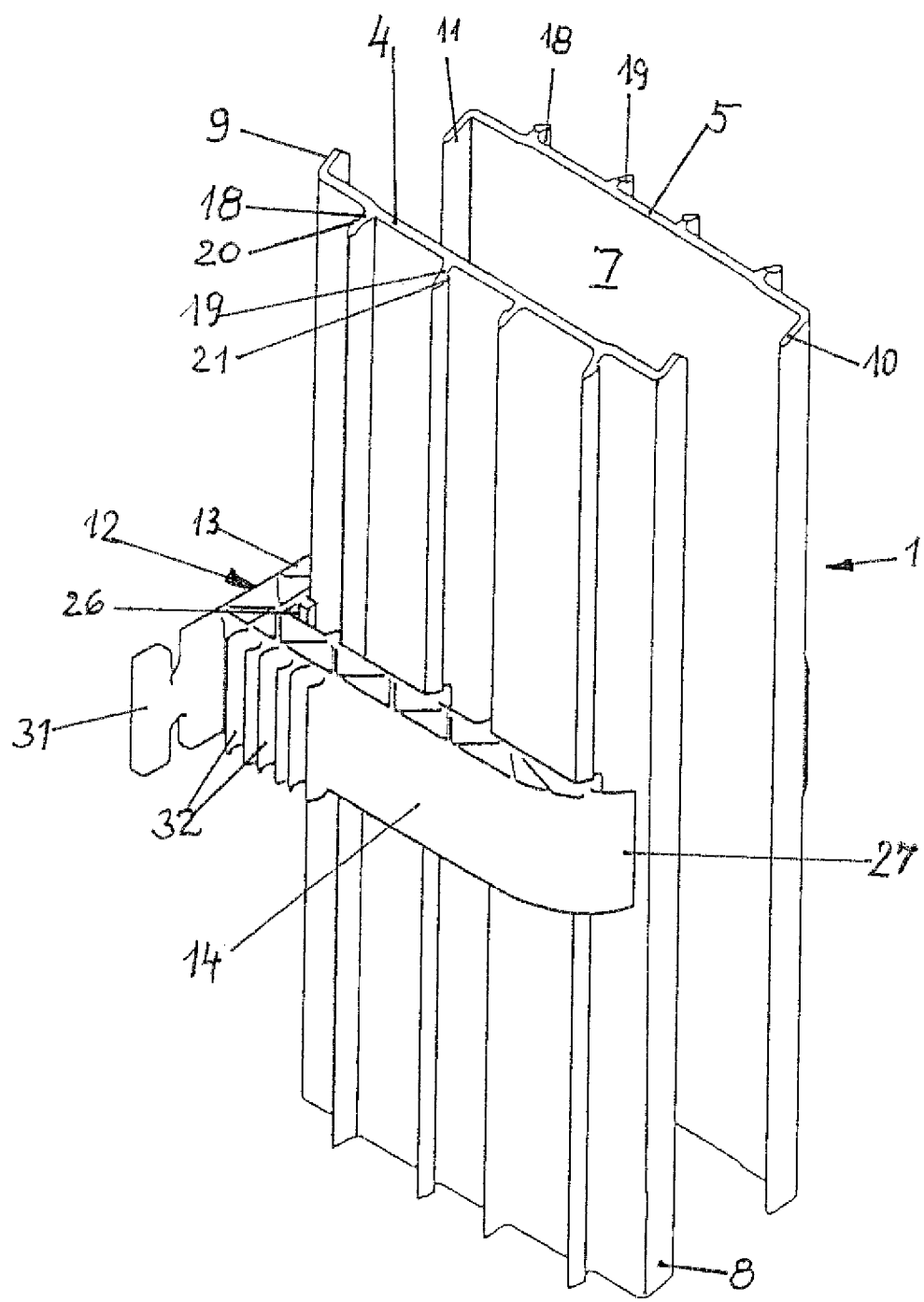
FIG. 4 the section according to FIG. 3 in a perspective representation.
Figure 5:
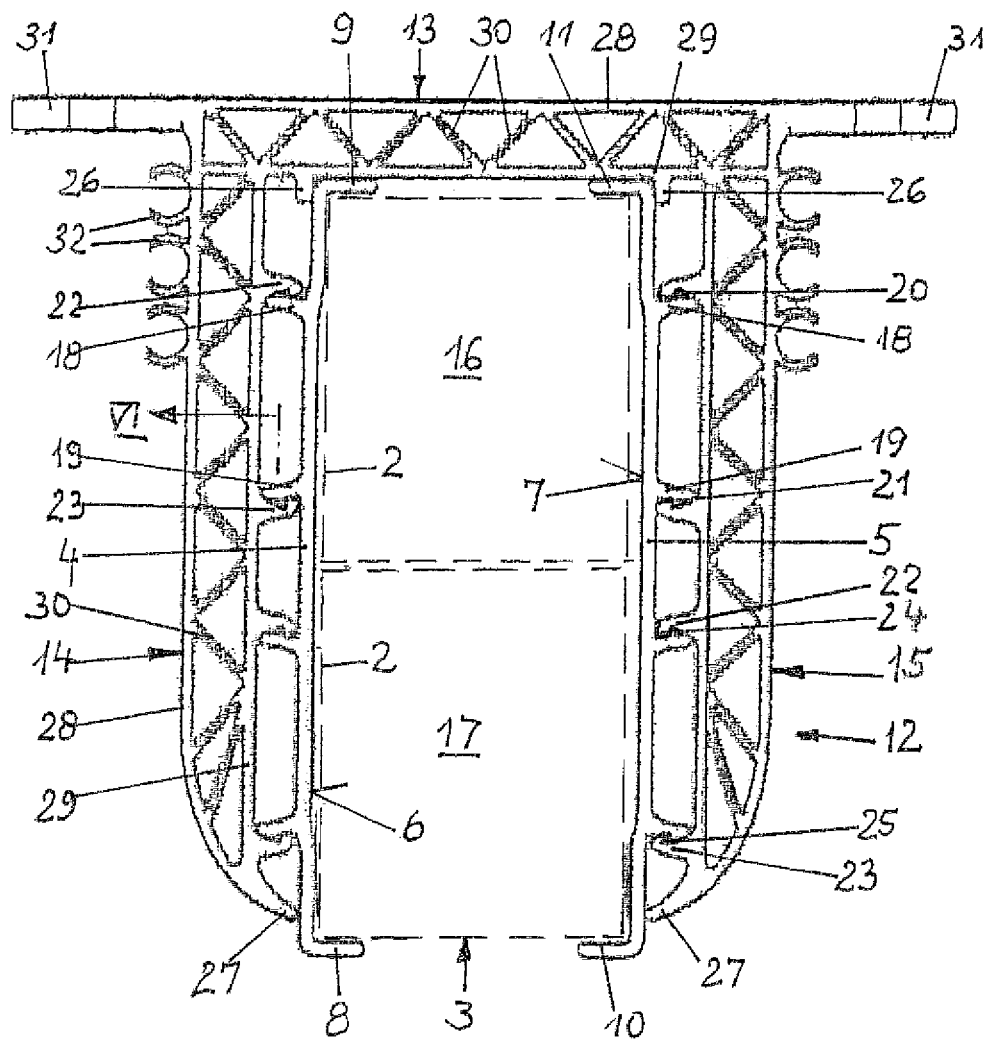
FIG. 5 a view of the bracket from above with the inserted guide plates.

The section III marked in FIG. 1 is represented in detail on an enlarged scale in FIGS. 3, 4 and 5.

As is revealed by these figures, the two guide plates 4 and 5 that are arranged opposite one another have smooth sliding surfaces 6 and 7, which are provided with guide flanges protruding at a right angle in their lateral edge regions, on their sides facing the receiving space for the energy chain, wherein the guide plate 4 has guide flanges 8 and 9 and the guide plate 5 has guide flanges 10 and 11.

As can be seen in particular from FIG. 5, the space between the two sliding surfaces 6 and 7 of the guide plates 4 and 5 serves as space for receiving two strands 16 and 17 of the energy chain 3 that are connected to one another by a deflection region and in each case consist of links 2 that are movably connected to one another.

The two guide plates 4 and 5 are held and fixed in their position exclusively by the brackets 12 that are arranged vertically offset.

The brackets 12 are formed U-shaped, wherein the exterior side of the U web 13 can be fastened to a smooth supporting wall. The guide plates 4 and 5 are in each case fastened to the interior sides of the U legs 14 and 15 of the respective bracket 12.

Catch means, which can engage firmly in one another, are provided on the rear sides of the guide plates 4 and 5 facing the U legs 14 and 15 of the brackets 12 and on the interior sides of the U legs 14 and 15.

The catch means provided on the rear sides of the guide plates 4 and 5 consist in each case of two pairs of protrusions 18 and 19, which are provided with undercut lugs 20 and 21. The undercut lugs 20 and 21 of a pair of protrusions 18 and 19 point in opposing directions, namely away from one another.

Corresponding counter-protrusions 22 and 23, formed in pairs, with undercut lugs 24 and 25 are formed on the U legs 14 and 15 of the brackets 12, wherein the lugs of each pair of protrusions point in opposing directions, namely towards one another in the present case.

When the guide plates 4 and 5 are pressed against the respective interior sides of the U legs 14 and 15, the lugs 18, 19, 22 and 23 formed on the protrusions 18 and 19 and counter-protrusions 22 and 23 snap in behind one another through slight elastic deformation of the protrusions and counter-protrusions. The respective pairs of protrusions 18 and 19 of the guide plates 5 and 6 reach between the pairs of protrusions 22 and 23 of the U legs 14 and 15 of the brackets 12, with the result that the lugs of the protrusions pointing in opposing directions engage behind one another.

As is revealed in particular by FIG. 5, in each case two pairs of protrusions 18 and 19, which cooperate in each case with two pairs of counter-protrusions 22 and 23 arranged on the U legs 14 and 15 of the brackets 12, are arranged on the guide plates 4 and 5.

The protrusions 18 and 19 and counter-protrusions 22 and 23 are formed as continuous ribs, wherein the undercut lugs 20, 21 and 24, 25 formed on the ribs also run continuously. The protrusions 18 and 19 and counter-protrusions 22 and 23 formed as ribs are arranged in the vertical direction.

The protrusions 18 and 19 formed as ribs on the rear sides of the guide plates 4 and 5 extend over the entire length of the guide plates 4 and 5 and thereby provide them with a particularly good stiffness, with the result that the guide plates 4 and 5 are also equipped with sufficient stiffness in the regions between two brackets 12 and guide the two strands of the energy chain reliably.

Figure 6:
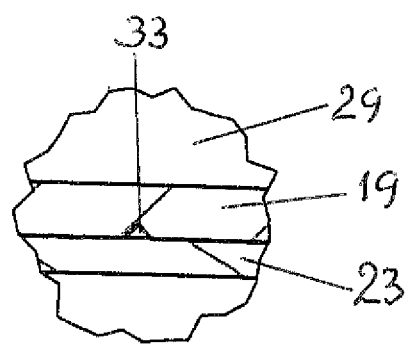
FIG. 6 a partial section along the line VI from FIG. 5 on an even further enlarged scale.

As represented in FIG. 6, individual protruding nubs 33, which increase the sliding resistance between the protrusions 18 and 19 and counter-protrusions 22 and 23 and thus improve the overall stability of the guide channel, are formed on the sides of the rib-shaped counter-protrusions 22 and 23 provided on the bracket 12 which rest against the rib-shaped protrusions 18 and 19 of the guide plates 4 and 5 in the engaged state.

For the exact positioning of the guide plates 4 and 5 between the U legs 14 and 15 of the brackets 12, in each case two stops 26 and 27 are provided on the brackets 12. The inner stop 26 is formed as a continuous stop bar on the interior side of the U web 13 and the outer stop 27 is formed as an inwardly bent tip of the respective U leg 14 or 15, respectively, of the bracket 12. Through this measure, an exact distance between the sliding surfaces 6 and 7 of the guide plates is set.

The brackets 12 are formed as one-piece plastic parts made of PVC or PE. The same also applies to the guide plates 4 and 5. Both the guide plates 4 and 5 and the brackets 12 are extruded or injection moulded, wherein the extrusion process advantageously lends itself at least to the elongated guide plates 4 and 5.

The brackets 12 have an extremely lightweight construction, namely the respective U web 13 and the two U legs 14 and 15 in each case consist of two plates 28 and 29 running at a distance from one another, which are connected to one another by ribs 30 arranged truss-like.

Protruding fastening flanges 31 are provided on both sides of the U web 13 for fastening the brackets 12 for example to a smooth supporting wall. The flanges are provided with cutouts or drilled holes through which fastening elements, for example screws, can be fed.

In the embodiment example represented in the drawing, additional retainers 32, to which lines to be laid in a fixed manner can be fastened, are provided on the exterior sides of the U legs of the brackets.

The vertical guide channel according to the invention has various advantages compared with the state of the art. It consists of few individual parts, which can preferably be produced inexpensively from plastic. Through the clever architecture of the brackets and guide plates, a remarkable stiffness of the overall device is achieved in spite of a low material outlay, with the result that a reliable operation is guaranteed.

LIST OF REFERENCE NUMBERS 1 guide channel
2 links
3 energy chain
4 guide plate
5 guide plate
6 sliding surface
7 sliding surface
8 guide flange
9 guide flange
10 guide flange
11 guide flange
12 bracket
13 U web
14 U leg
15 U leg
16 strand
17 strand
18 protrusions
19 protrusions
20 undercut lug
21 undercut lug
22 counter-protrusion
23 counter-protrusion
24 undercut lug
25 undercut lug
26 stop
27 stop
28 plates
29 plates
30 ribs
31 fastening flanges
32 retainers
33 nubs

What is claimed is:

1. A guide channel-type device for guiding an energy chain, having links that are movably connected to one another, along a vertical line or a line extending with a vertical component, wherein flexible supply lines which connect a connector arranged at a fixed height to a vertically movable device or a machine are guided in the energy chain, and wherein the energy chain is guided between lateral delimiting walls, the guide channel-type device comprising:
   two separate guide plates, which are arranged opposite one another;
   the two guide plates each having a smooth sliding surface on a respective side facing the energy chain,
   each of the sliding surfaces extending between a first guide flange at a first lateral edge region and a second guide flange at a second lateral edge region, respectively, the first guide flanges protruding at right angles towards each other and the second guide flanges protruding at right angles towards each other;
   the first guide flanges and the second guide flanges
   the guide plates retained in brackets, which are fastenable at intervals, with a height offset, to a supporting wall;
   the brackets formed U-shaped, wherein an exterior side of a U web of the bracket is restable against the supporting wall; and
   the guide plates fastenable to interior sides of U legs of the bracket; and
   the guide plates, the first guide flanges and the second guide flanges are arranged along the vertical line or the line extending with the vertical component.

2. The guide channel-type device for guiding an energy chain according to claim 1, wherein:
   the guide channel is configured to receive two strands of the energy chain connected to one another by a deflection region; and
   the first and second guide flanges delimit a space in which the two strands of the energy chain move.

3. The guide channel-type device for guiding an energy chain according to claim 1, wherein, catch means, which are engageable in one another, are provided on rear sides of the guide plates facing the U legs of the brackets and on the interior sides of the U legs.

4. The guide channel-type device for guiding an energy chain according to claim 3, wherein:
   the catch means provided on the rear sides of the guide plates are protrusions, provided in pairs, with undercut lugs;
   the lugs of a pair of protrusions point in opposing directions;
   corresponding counter-protrusions, formed in pairs, with undercut lugs which likewise point in opposing directions, are formed on the U legs; and
   when the guide plates are pressed against the interior sides of the U legs, the lugs formed on the protrusions and counter-protrusions snap in behind one another through elastic deformation of the protrusions and counter-protrusions.

5. The guide channel-type device for guiding an energy chain according to claim 4, wherein two pairs of protrusions are arranged on the rear sides of the guide plates and two pairs of counter-protrusions are arranged on the interior sides of the U legs.

6. The guide channel-type device for guiding an energy chain according to claim 4, wherein:
   the protrusions and the counter-protrusions are formed as continuous ribs; and the undercut lugs formed on the ribs are formed as continuous lugs.

7. The guide channel-type device for guiding an energy chain according to claim 6, wherein the protrusions and the counter-protrusions formed as ribs extend in a vertical direction.

8. The guide channel-type device for guiding an energy chain according to claim 7, wherein the protrusions formed as the ribs on the rear sides of the guide plates extend over an entire length of the guide plates.

9. The guide channel-type device for guiding an energy chain according to claim 7, wherein nubs are formed on the sides of the rib-shaped counter-protrusions provided on the brackets which rest against the rib-shaped protrusions of the guide plates in an engaged state.

10. The guide channel-type device for guiding an energy chain according to claim 1, wherein, for a positioning of the guide plates, at least one inner stop and at least one outer stop are provided on the brackets.

11. The guide channel-type device for guiding an energy chain according to claim 10, wherein the inner stop is formed as a continuous stop bar on the interior side of the U web and the outer stop is formed as an inwardly bent tip of the respective U leg of the bracket.

12. The guide channel-type device for guiding an energy chain according to claim 1, wherein the brackets are formed as one-piece plastic parts.

13. The guide channel-type device for guiding an energy chain according to claim 12, wherein the brackets are formed of PVC or PE.

14. The guide channel-type device for guiding an energy chain according to claim 1, wherein the guide plates are formed as one-piece plastic parts of PVC or PE.

15. The guide channel-type device for guiding an energy chain according to claim 1, wherein the guide plates and the brackets are extruded or injection moulded.

16. The guide channel-type device for guiding an energy chain according to claim 1, wherein the U web and the two U legs of the bracket in each case have two plates extending at a distance from one another, which are connected to one another by ribs arranged truss-like.

17. The guide channel-type device for guiding an energy chain according to claim 1, wherein protruding fastening flanges, via which the respective bracket are connectable to the supporting wall with aid of fastening elements, are provided on both sides of the U web of the bracket.

18. The guide channel-type device for guiding an energy chain according to claim 1, wherein retainers for lines to be laid in a fixed manner are arranged on an exterior side of the U legs of the brackets.

19. A guide channel-type device for guiding an energy chain, having links that are movably connected to one another, along a vertical line or a line extending with a vertical component, wherein flexible supply lines which connect a connector arranged at a fixed height to a vertically movable device or a machine are guided in the energy chain, and wherein the energy chain is guided between lateral delimiting walls, the guide channel-type device comprising:

two separate guide plates, which are arranged opposite one another;

the two guide plates each having a smooth sliding surface on a respective side facing the energy chain, each of the sliding surfaces extending between a first guide flange at a first lateral edge region, and a second guide flange at a second lateral edge region, respectively, the first guide flanges protruding at right angles towards each other and the second guide flanges protruding at right angles towards each other;

the guide plates retained in brackets, which are fastenable at intervals, with a height offset, to a supporting wall;

the brackets formed U-shaped, wherein an exterior side of a U web of the bracket is restable against the supporting wall;

the guide plates fastenable to interior sides of U legs of the bracket;

wherein, catch means, which are engageable in one another, are provided on rear sides of the guide plates facing the U legs of the brackets and on the interior sides of the U legs;

wherein the catch means provided on the rear sides of the guide plates are protrusions, provided in pairs, with undercut lugs;

wherein the lugs of a pair of protrusions point in opposing directions;

wherein corresponding counter-protrusions, formed in pairs, with undercut lugs which likewise point in opposing directions, are formed on the U legs; and wherein, when the guide plates are pressed against the interior sides of the U legs, the lugs formed on the protrusions and counter-protrusions snap in behind one another through elastic deformation of the protrusions and counter-protrusions.

20. The guide channel-type device for guiding an energy chain according to claim 19, wherein two pairs of protrusions are arranged on the rear sides of the guide plates and two pairs of counter-protrusions are arranged on the interior sides of the U legs.

21. The guide channel-type device for guiding an energy chain according to claim 19, wherein:

the protrusions and the counter-protrusions are formed as continuous ribs; and the undercut lugs formed on the ribs are formed as continuous lugs.

22. The guide channel-type device for guiding an energy chain according to claim 21, wherein the protrusions and the counter-protrusions formed as ribs extend in a vertical direction.

23. The guide channel-type device for guiding an energy chain according to claim 22, wherein the protrusions formed as the ribs on the rear sides of the guide plates extend over an entire length of the guide plates.

24. The guide channel-type device for guiding an energy chain according to claim 22, wherein nubs are formed on the sides of the rib-shaped counter-protrusions provided on the brackets which rest against the rib-shaped protrusions of the guide plates in an engaged state.

* * * * *